(12) United States Patent
Moon

(10) Patent No.: US 10,503,471 B2
(45) Date of Patent: Dec. 10, 2019

(54) ELECTRONIC DEVICES AND OPERATION METHODS OF THE SAME

(71) Applicant: Samsung Electronics Co., Ltd., Suwon-si, Gyeonggi-do (KR)

(72) Inventor: Donguk Moon, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 15/618,636

(22) Filed: Jun. 9, 2017

(65) Prior Publication Data

US 2018/0181372 A1 Jun. 28, 2018

(30) Foreign Application Priority Data

Dec. 26, 2016 (KR) .................. 10-2016-0179164

(51) Int. Cl.

| | |
|---|---|
| *G06F 5/14* | (2006.01) |
| *G06F 1/3206* | (2019.01) |
| *G06F 1/3234* | (2019.01) |
| *G06F 1/3237* | (2019.01) |
| *G06F 1/3228* | (2019.01) |
| *G06F 1/3215* | (2019.01) |
| *G06F 12/0875* | (2016.01) |
| *G06F 12/0831* | (2016.01) |
| *G06F 1/324* | (2019.01) |
| *G06F 1/3287* | (2019.01) |

(52) U.S. Cl.
CPC ............... *G06F 5/14* (2013.01); *G06F 1/324* (2013.01); *G06F 1/3206* (2013.01); *G06F 1/3215* (2013.01); *G06F 1/3228* (2013.01); *G06F 1/3237* (2013.01); *G06F 1/3243* (2013.01); *G06F 1/3287* (2013.01); *G06F 12/0831* (2013.01); *G06F 12/0875* (2013.01); *G06F 2205/126* (2013.01); *G06F 2212/621* (2013.01); *Y02D 10/128* (2018.01); *Y02D 10/152* (2018.01)

(58) Field of Classification Search
CPC ......... G06F 1/04; G06F 1/3234; G06F 1/3246
See application file for complete search history.

(56) References Cited

U.S. PATENT DOCUMENTS

| | | | |
|---|---|---|---|
| 7,721,118 B1 | 5/2010 | Tamasi et al. | |
| 7,802,118 B1 | 9/2010 | Abdalla et al. | |
| 8,400,458 B2 | 3/2013 | Wu et al. | |
| 8,438,416 B2 | 5/2013 | Kocev et al. | |
| 8,589,629 B2 | 11/2013 | Owen et al. | |

(Continued)

FOREIGN PATENT DOCUMENTS

| | | |
|---|---|---|
| KR | 2012/0054027 A | 5/2012 |
| KR | 10-1564816 B1 | 10/2015 |

OTHER PUBLICATIONS

Extended Search Report dated Jan. 22, 2018 issued in corresponding European Application No. 17184172.9-1221.

*Primary Examiner* — Getente A Yimer
(74) *Attorney, Agent, or Firm* — Harness, Dickey & Pierce, P.L.C.

(57) ABSTRACT

An electronic device according to some example embodiments includes a clock management circuit configured to control a clock signal and a processor circuit directly connected to the clock management circuit and configured to provide a clock control request for the clock signal to the clock management circuit according to an operation status of the processor circuit.

22 Claims, 5 Drawing Sheets

(56) References Cited

U.S. PATENT DOCUMENTS

| | | | |
|---|---|---|---|
| 8,937,622 B2 | 1/2015 | Bourd et al. | |
| 9,323,315 B2 | 4/2016 | Rozas | |
| 9,354,944 B2 | 5/2016 | Gaster et al. | |
| 2003/0033510 A1* | 2/2003 | Dice | G06F 9/383 712/235 |
| 2006/0242449 A1* | 10/2006 | Frederick | G01R 31/31727 713/600 |
| 2007/0198757 A1* | 8/2007 | Kim | G06F 1/3215 710/46 |
| 2009/0307517 A1* | 12/2009 | Fehr | H04B 1/7156 713/500 |
| 2009/0319820 A1* | 12/2009 | Wu | G06F 1/08 713/600 |
| 2012/0069029 A1 | 3/2012 | Bourd et al. | |
| 2012/0166861 A1* | 6/2012 | Lu | G06F 1/08 713/501 |
| 2014/0173311 A1* | 6/2014 | Park | G06F 1/206 713/320 |
| 2015/0205344 A1* | 7/2015 | Diefenbaugh | G06F 1/3234 713/320 |
| 2015/0296452 A1* | 10/2015 | Hu | H04W 52/0274 375/376 |
| 2015/0378411 A1* | 12/2015 | Grenat | G01R 19/0084 713/340 |
| 2016/0077565 A1* | 3/2016 | Jayaseelan | G06F 9/546 713/340 |
| 2016/0350259 A1 | 12/2016 | Jeon et al. | |

* cited by examiner

ELECTRONIC DEVICES AND OPERATION METHODS OF THE SAME

CROSS-REFERENCE TO RELATED APPLICATIONS

This application claims the benefit, under 35 U.S.C. § 119, of Korean Patent Application No. 10-2016-0179164, filed on Dec. 26, 2016, in the Korean Intellectual Property Office, the disclosure of which is incorporated herein in its entirety by reference.

BACKGROUND

1. Field

The present disclosure relates to electronic devices and operation methods of the same.

2. Description of the Related Art

In a system on chip (SoC) where several devices of an electronic device are integrated into one chip, power management may be easy to perform. In some cases, if and/or when clock gating for disabling a clock for a device integrated in the SoC is performed, dynamic power of the device may be reduced. In some cases, if and/or when clock gating is performed for a particular device, a central processing unit (CPU) may access a driver of the device to check a job queue, and if the job queue is empty, the CPU may determine that the device is in an idle status. Thereafter, the CPU may control a clock management unit (CMU), which is one of the devices integrated in the SoC, through a driver of the CMU to gate a clock of the device.

SUMMARY

Provided are an electronic device and an operation method of the same, by which dynamic power may be reduced.

Additional aspects will be set forth in part in the description which follows and, in part, will be apparent from the description, or may be learned by practice of some example embodiments.

According to some example embodiments, an electronic device may include a clock management circuit and a processor circuit directly connected to the clock management circuit. The clock management circuit may be configured to control a clock signal. The processor circuit may be configured to communicate a clock control request associated with the clock signal to the clock management circuit according to an operation status of the processor circuit.

According to some example embodiments, an operation method of an electronic device may include determining an operation status of a processor circuit of the electronic device, and directly communicating, based on using the processor circuit, a clock control request associated with a clock signal to a clock management circuit according to the operation status of the processor circuit.

According to some example embodiments, an electronic device may include a first processor circuit and a second processor circuit configured to support hardware cache coherence, and a clock management circuit configured to control both a clock signal of the first processor circuit and a clock signal of the second processor circuit. The second processor circuit may be configured to communicate a clock enable request to the clock management circuit based on a determination that the second processor circuit has received a cache coherence signal from the first processor circuit. The clock management circuit may be configured to enable the second processor circuit in response to the clock enable request.

According to some example embodiments, an electronic device may include a memory storing a program of instructions, and a processor. The processor may be configured to execute the program of instructions to determine an operation status associated with the processor and communicate a clock control request associated with a clock signal to a clock management circuit according to the operation status of the processor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
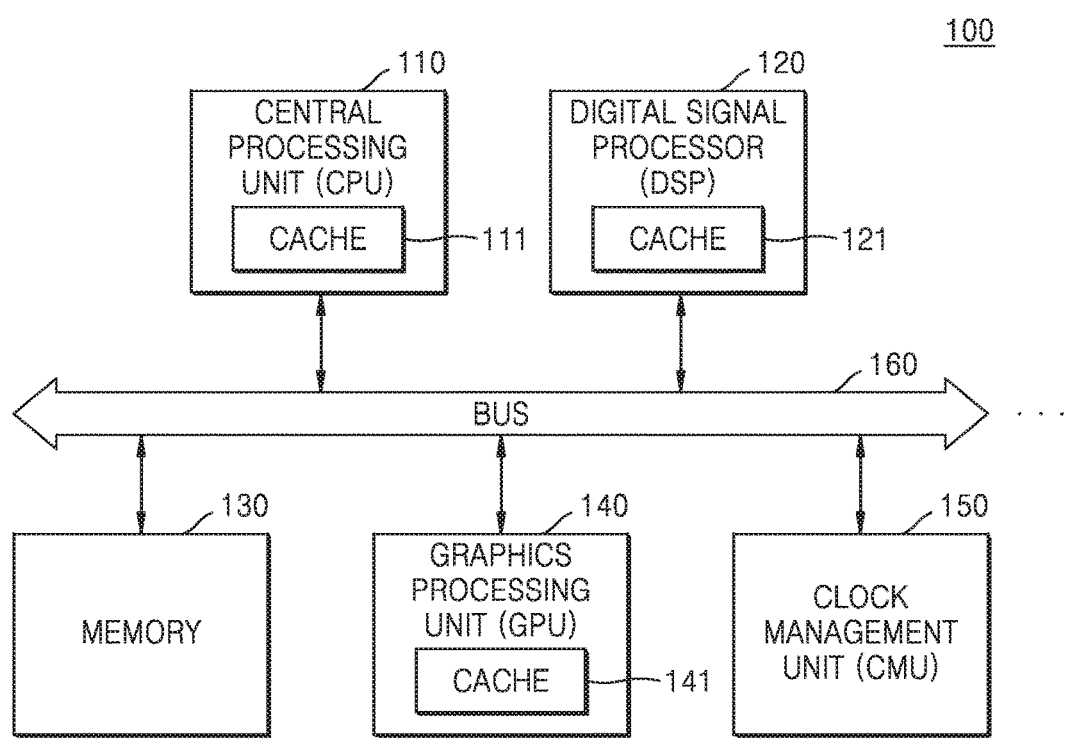
FIG. 1 illustrates an electronic device according to some example embodiments.

Reference will now be made in detail to example embodiments, examples of which are illustrated in the accompanying drawings, wherein like reference numerals refer to like elements throughout. In this regard, some example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items.

Hereinafter, various example embodiments will be described in detail with reference to the accompanying drawings. Example embodiments to be described below may be carried out after being modified in various different forms. To clearly describe characteristics of the example embodiments, matters widely known to those of ordinary skill in the art to which the example embodiments belong will not be described in detail.

Herein, when an element is connected to another element, the element is not only directly connected to another element but also electrically connected to another element with another element intervening in them. If it is assumed that a certain element includes a certain element, the term 'including' means that a corresponding element may further include other elements unless a specific meaning opposed to the corresponding element is written.

FIG. 1 illustrates an electronic device according to some example embodiments.

Referring to FIG. 1, an electronic device 100 according to some example embodiments may include a central processing unit (CPU) 110, a digital signal processor (DSP) 120, a memory 130, a graphics processing unit (GPU) 140, and a clock management unit (CMU) 150. However, such a structure is merely an example, and the electronic device 100 may further include various other devices. For example, the electronic device 100 may further include an input/output (I/O) interface. Each of the CPU 110, the DSP 120, the GPU 140, and the CMU 150 may include an instance of electronic circuitry configured to implement the CPU 110, the DSP 120, the GPU 140, and the CMU 150, respectively. One or more of the CPU 110, the DSP 120, the GPU 140, and the CMU 150 may include a processor. As referred to herein, a processor may be interchangeably referred to as a "processor circuit" and/or a "processing device."

Processing devices such as the CPU 110, the DSP 120, the GPU 140, and the CMU 150 may include one or more instances of electronic circuitry that are configured to process data by receiving, storing, calculating, and outputting the data, depending on their functions, respectively. Processing devices such as the CPU 110, the DSP 120, the GPU 140, and the CMU 150 may be processing devices ("processor circuits") that are associated with different types of processing devices (e.g., different processor circuit types). Such processing devices may include caches 111, 121, and 141 for data processing, respectively. The electronic device 100 may support cache coherence for sharing stored data among the caches 111, 121, and 141. The cache coherence may be supported through direct connection between hardware, instead of software processing. This will be described in more detail below.

The memory 130 (also referred to interchangeably herein as a "memory device") may include an instance of electronic circuitry that is configured to store an operating system (OS), various programs and data related to driving of the electronic device 100. The data stored in the memory 130 may be provided to each processing device. In some example embodiments, the CPU 110, the DSP 120, the GPU 140, and the CMU 150 may each be configured to implement one or more instances of functionality and/or units, elements, etc. as described herein based on executing a program of instructions stored at the memory 130. The memory 130 may be a non-transitory computer readable storage medium that stores one or more programs of instruction.

The CMU 150 may include an instance of electronic circuitry that is configured to manage a clock signal of the electronic device 100. The CMU 150 may control a clock signal input to each device such as the CPU 110, the DSP 120, the memory 130, the GPU 140, or the like. More specifically, the CMU 150 selectively enables or disables a clock signal input to each device. The clock management unit (CMU) is referred to interchangeably herein as a "clock management circuit."

Separate devices are connected to a bus 160. The bus 160 may include a system bus and may be implemented as a bus to which a protocol having specific standard bus specifications is applied. For example, as the standard bus specifications, an Advanced Microcontroller Bus Architecture (AMBA) protocol of Advanced RISC Machine (ARM) may be applied. In addition, other types of protocols such as uNetwork of SONICs, Inc., CoreConnect of IBM, Open Core Protocol of OCP-IP, etc., may also be applied to a system bus.

The electronic device 100 may be implemented with a system on chip (SoC). In other words, the CPU 110, the DSP 120, the memory 130, the GPU 140, and the CMU 150 may be integrated into one chip.

Figure 2:
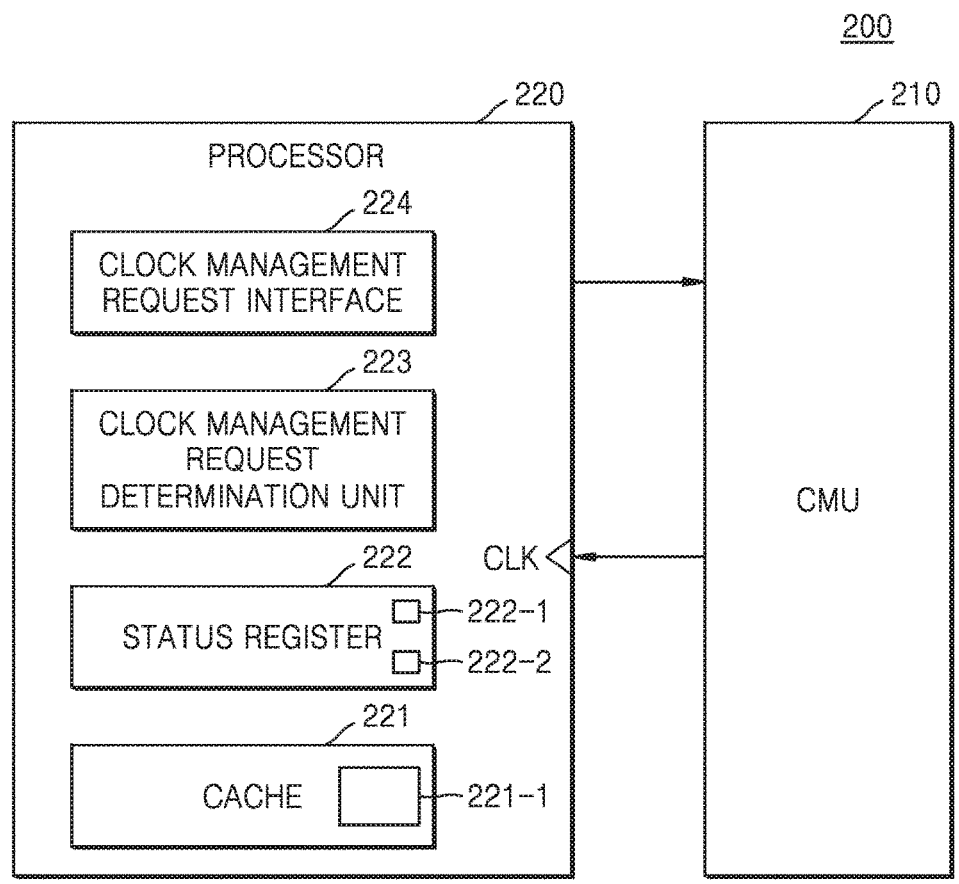
FIG. 2 is a block diagram illustrating an internal structure of an electronic device according to some example embodiments.

FIG. 2 is a block diagram illustrating an internal structure of an electronic device according to some example embodiments.

Referring to FIG. 2, an electronic device 200 may include a CMU 210 and a processor 220. As shown in FIG. 2, the processor 220 may include a cache 221, a status register 222, a clock management request determination unit 223, and a clock management request interface 224. Each of the cache 221, the status register 222, the clock management request determination unit 223, and the clock management request interface 224 may be implemented by separate, respective instances of electrical circuitry in the processor 220. The processor 220 may be directly connected to the CMU (e.g., via one or more hardware direct structural interfaces, hardware direct communication interfaces, some combination thereof, or the like).

The CMU 210 controls a clock signal. The CMU 210 may control a clock signal to multiple circuits (e.g., control both a clock signal of a first processor circuit and a clock signal of a second processor circuit). The CMU 210 receives a clock control request from the processor 220 directly connected thereto. The CMU 210 may directly receive the clock control request from the processor 220 without the clock control request passing through another device. The processor 220 may be referred to interchangeably herein as a processor circuit.

The CMU 210 may selectively enable (e.g., selectively enable or disable) a clock signal input to the processor 220 at the request of the processor 220 (e.g., selectively enable or disable the clock signal input based on whether a clock enable request or a clock disable request is received from the processor 220, respectively). The CMU 210, even when the CMU 210 receives a clock disable request from the processor 220, may selectively maintain a clock signal input to the processor 220 enabled (e.g., selectively enable the clock signal input without disabling the clock signal, based on a determination that a time interval between the reception of the clock disable request and the immediately previous ("immediately preceding") enabling of the clock signal is less than or equal to a particular threshold time. As such, the CMU 210 may improve the processing efficiency of the processor 220 by maintaining a clock status change interval for a specific time or longer.

A clock control operation of the CMU 210 will be described in detail with reference to FIGS. 3 and 4.

Figure 3:
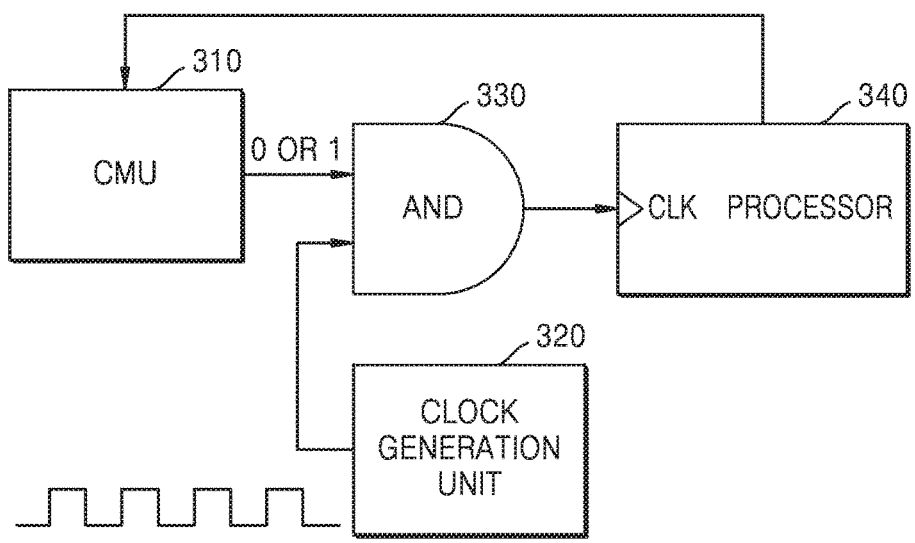
FIG. 3 illustrates a clock control operation of an electronic device according to some example embodiments.

FIG. 3 illustrates a clock control operation of an electronic device according to some example embodiments.

In FIG. 3, a processor 340, e.g., a processing device such as a GPU, a DSP, or the like, receives a clock under control of a CMU 310.

The CMU 310 receives a clock control request from the processor 340 and outputs 0 or 1 to an AND gate 330.

A clock generation unit 320 (also referred to herein as a "clock generation circuit") may generate a clock signal and outputs ("communicates") the generated clock signal to the AND gate 330.

When the CMU 310 outputs 0, a signal input to the processor 340 by the AND gate 330 is 0, such that the clock signal of the processor 340 is disabled. When the CMU 310 outputs 1, the clock signal generated by the clock generation unit 320 is input ("communicated") to the processor 340 by the AND gate 330, such that the clock signal of the processor 340 is enabled.

According to some example embodiments, the processor 340 may be directly connected to the CMU 310 without being connected thereto through another device (e.g., directly communicatively connected to the CMU 310 via a hardware direct communication interface), such that the processor 340 is configured to selectively deliver ("communicate") a clock enable request or a clock disable request, for the clock signal input to the processor 340, directly to the CMU 310 (e.g., via a hardware direct communication interface) based on whether the processor 340 is in an idle status or an active status, respectively. Thus, there is no signal processing delay, allowing the clock signal to be immediately enabled or disabled.

Figure 4:
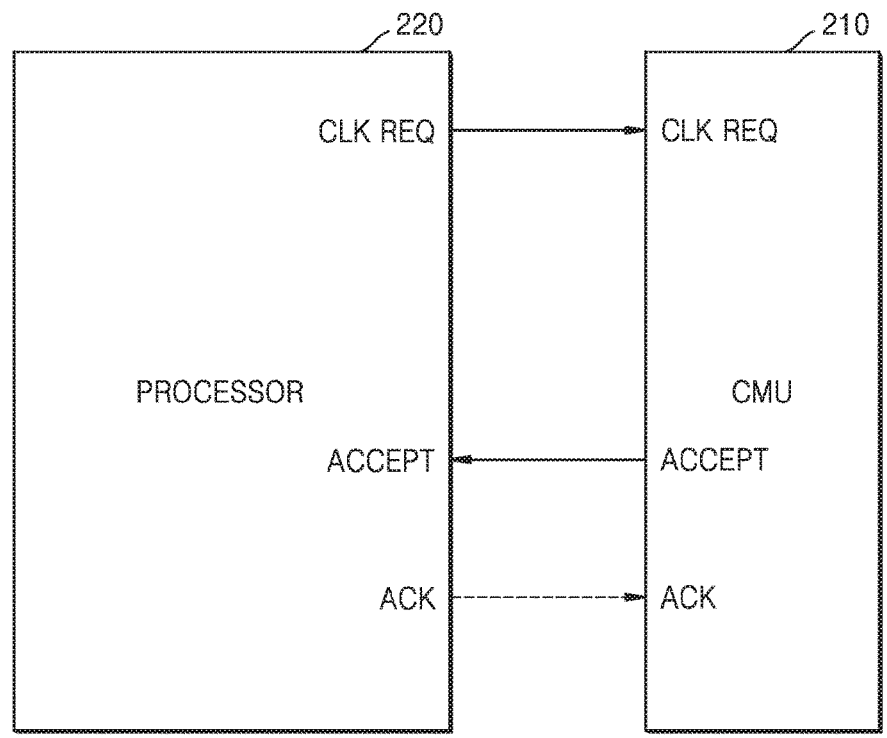
FIG. 4 illustrates an operation between a clock management request interface and a clock management unit (CMU) according to some example embodiments.

FIG. 4 illustrates an operation between a clock management request interface and a CMU according to some example embodiments.

Referring to FIG. 4, the processor 220 selectively provides ("communicates") a clock management request signal CLK REQ to the CMU 210, where the clock management request signal CLK REQ is a clock enable request or a clock disable request, based on whether the processor 220 is in the idle status or the active status, respectively.

The CMU 210, having received the clock management request signal CLK REQ, provides ("communicates") a signal ACCEPT, indicating signal reception, to the processor 220, such that a handshake is implemented between the processor 220 and the CMU 210.

In response to the processor 220 receiving the signal ACCEPT, the processor 220 sends ("communicates") a signal ACK associated with acknowledging the reception of the signal ACCEPT to the CMU 210.

Referring back to FIG. 2, the processor 220 may include a cache 221, a status register 222 that may store an operation status of ("associated with") the processor 220, a clock management request determination unit 223 that may determine the operation status of the processor 220, stored in the status register 222 (e.g., the "stored operation status"), and a clock management request interface 224 directly connected with the CMU 210. The processor 220 may be configured to implement some or all of the cache 221, the status register 222, the clock management request determination unit 223, and the clock management request interface 224 based on executing a program of instructions. Such a program of instructions may be stored in a memory, such as the memory 130 shown in FIG. 1.

The cache 221 may be a last level cache (LLC). The cache 221 may include a cache coherence interface 221-1 that is configured to support cache coherence, and is configured to support hardware cache coherence in conjunction with a cache included in another device based on using the cache coherence interface.

The processor 220 may directly and selectively provide ("communicate") the clock enable request or the clock disable request to the CMU 210 through the clock management request interface 224 according to a determination result of the clock management request determination unit 223 (e.g., based on whether the processor 220 is in the idle status or the active status, respectively).

The status register 222 may include a processor status register 222-1 that may store a status of a pipeline of the processor 220 and a cache status register 222-2 that may store a status of the cache 221. The processor status register 222-1 may store an indication of whether the pipeline of the processor 220 is in an active status or an idle status. More specifically, the processor status register 222-1 may be updated to the idle status based on the processor 220 completing the last job in a job queue (e.g., based on a determination that the processor circuit has completed a last job in a job queue). The cache status register 222-2 may store an indication of whether the cache 221 is in the active status or the idle status. More specifically, the cache status register 222-2 may be updated to the idle status based on the cache 221 completing a requested job (e.g., a determination that the cache 221 has completed a requested job) and being under a First-In-First-Out (FIFO) empty condition. The cache status register 222-2 may indicate whether a memory system of the processor 220 is in the idle status.

The clock management request determination unit 223 may determine, based on using the status register 222, whether the processor 220 is in the idle status or the active status. More specifically, the clock management request determination unit 223 may determine, based on the status of the pipeline of the processor 220 and the status of the cache 221, which are stored in the status register 222, whether the processor 220 is in the idle status or the active status.

The clock management request determination unit 223 may determine whether a cache coherence signal related to cache coherence is transmitted to or received from another processor, at the processor 220, through a cache coherence interface. To be more specific, the clock management request determination unit 223 determines whether a cache coherence traffic is being transmitted to or received from another processor. More specifically, the clock management request determination unit 223 may determine whether a snoop traffic for cache coherence is transmitted to or received from another processor. The clock management request determination unit 223 determines whether another device (e.g., a separate device) has accessed the processor 220 (e.g., a processor circuit). More specifically, the clock management request determination unit 223 may determine whether another device is performing a read or write operation with respect to a control register or a status register of the processor 220 through a processor device driver.

Based on the clock management request determination unit 223 determining that the pipeline of the processor 220 and the cache 221 are in the idle state and the cache coherence traffic is not being transmitted or received, and another device (e.g., the separate device) has not accessed the processor 220 (e.g., the processor circuit), the clock management request determination unit 223 may determine that the processor 220 is in the idle state. Based on the clock management request determination unit 223 determining that the pipeline of the processor 220 or the cache 221 is in the active state, or the cache coherence traffic is being transmitted or received, or another device has accessed the processor 220, the clock management request determination unit 223 may determine that the processor 220 is in the active state.

A more detailed description will be made with reference to FIG. 5.

Figure 5:
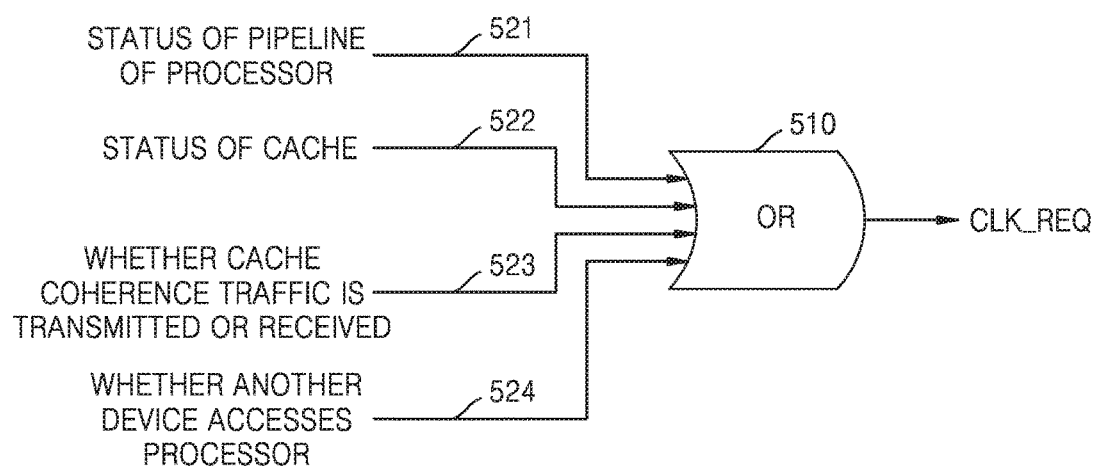
FIG. 5 illustrates an operation of transmitting a clock enable request or a clock disable request to a CMU based on a determination result of a clock management request determination unit according to some example embodiments.

FIG. 5 illustrates an operation of selectively transmitting ("communicating") a clock enable request or a clock disable request to a CMU based on a determination result of a clock management request determination unit according to some example embodiments (e.g., based on whether a processor is in an idle status or an active status, respectively). The operation illustrated in FIG. 5 may be implemented by some or all of the processors, processing devices, etc. described herein.

Referring to FIG. 5, the clock management request determination unit 223 determines the clock enable request or the clock disable request for the CMU 210 according to the following four conditions:

1. the status of the pipeline of the processor 220;
2. the status of the cache 221;
3. whether a cache coherence traffic is transmitted to or received from another processor; and
4. whether another device has accessed the processor 220.

In some example embodiments, based on the clock management request signal CLK REQ output from the clock management request interface 224 being 0 (e.g., having a value of 0), the clock disable request may be selectively sent ("communicated") to the CMU 210. More specifically, based on a first input 521 of an OR gate 510 being 0 because the pipeline of the processor 220 is in the idle state, a second input 522 of the OR gate 510 being 0 because the cache 221 is in the idle state, a third input 523 of the OR gate 510 being 0 because the cache coherence traffic is not transmitted or received, and a fourth input 524 of the OR gate 510 being 0 because another device has not accessed the processor 220, that is, if all the first to fourth inputs 521 through 524 of the OR gate 510 are 0, then an output of the OR gate 510 may be 0. In this case, the clock management request determination unit 223 determines that the processor 220 is in the idle state and provides ("communicates") the clock disable request in which the clock management request signal CLK REQ is 0 to the CMU 210 through the clock management request interface 224.

On the other hand, based on the clock management request signal CLK REQ output from the clock management request interface 224 being 1, the clock enable request may be selectively provided to the CMU 210. More specifically, based on the first input 521 of the OR gate 510 being 1 because the pipeline of the processor 220 is in the active state, or the second input 522 of the OR gate 510 being 1 because the cache 221 is in the active state, or the third input 523 of the OR gate 510 being 1 because the cache coherence traffic is transmitted or received, or the fourth input 524 of the OR gate 510 being 1 because another device has accessed the processor 220, that is, if any one of the four inputs 521 through 524 of the OR gate 510 is 1, then the output of the OR gate 510 is 1. The clock enable request is generated based on the clock of the processor 220 being in a disabled state, such that based on the cache coherence traffic being transmitted or received (e.g., communicated between the processor 220 and another "separate" device) or another device has accessed the processor 220, the clock enable request is provided. Thus, the processor 220 provides the clock enable request in which the clock management request signal CLK REQ is 1 to the CMU 210 through the clock management request interface 224.

According to some example embodiments, another "separate" device accessing the processor 220 does not determine the operation status of the processor 220; instead, the clock management request determination unit 223 included in the processor 220 determines an idle point in time of the processor 220. The processor 220 is directly connected to the CMU 210 (e.g., via one or more hardware direct structural interfaces, hardware direct communication interfaces, some combination thereof, or the like) such that the processor 220 is configured to provide a clock control request directly (e.g., via a hardware direct communication interface), such that another device may not store a command for controlling the clock of the processor 220 in the control register of the CMU 210. Thus, there is no signal processing delay, allowing the clock to be immediately enabled or disabled.

Referring back to FIG. 2, the electronic device 200 may include a bus, and the clock management request interface 224 may be directly connected to the CMU 210 through the bus. The electronic device 200 supports cache coherence between the cache 221 of the processor 220 and a cache included in another device through the bus. A more detailed description will be made with reference to FIG. 6.

Figure 6:
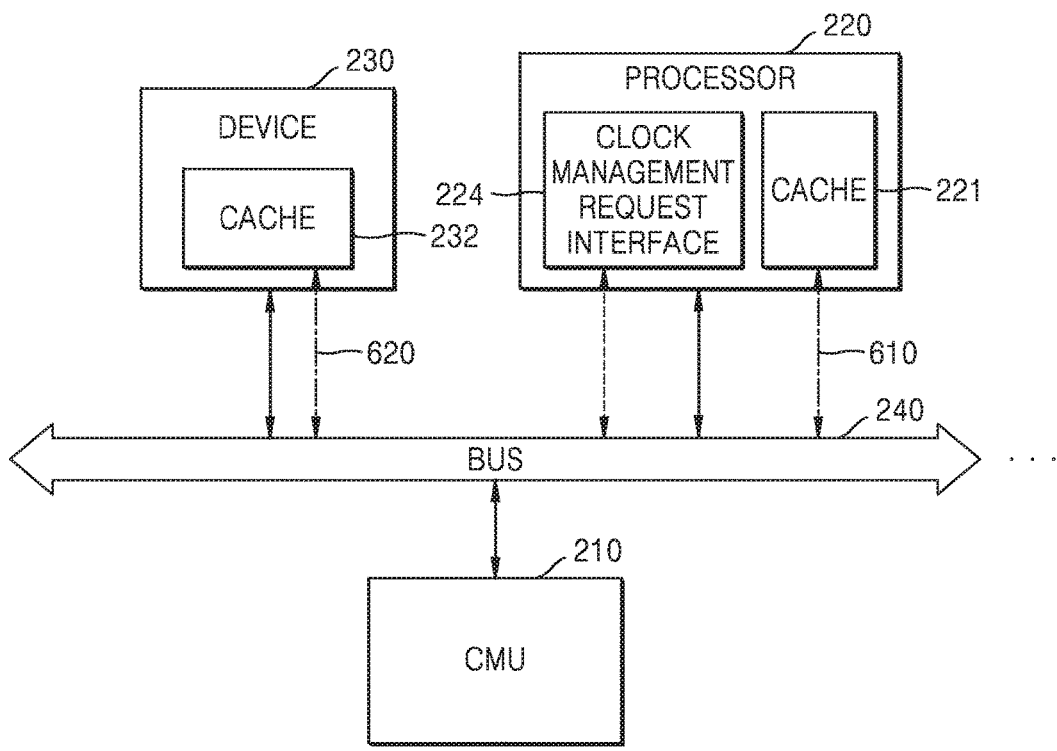
FIG. 6 is a block diagram of a clock management request interface and a cache coherence interface according to some example embodiments.

FIG. 6 is a block diagram of a clock management request interface and a cache coherence interface according to some example embodiments.

Referring to FIG. 6, the electronic device 200 may include the CMU 210, the processor 220, and another device 230. "Another device," as described herein, may be referred to interchangeably herein as a "separate device." Furthermore, as noted herein, a "processor" may be referred to interchangeably herein as a "processor circuit."

The processor 220 may include the cache 221 and the clock management request interface 224, and the cache 221 may include a cache coherence interface 610. The device 230 may include a cache 232 which may include a cache coherence interface 620. The device 230 may be, for example, a CPU, and the processor 220 may be a processor such as a GPU or a DSP. The processor 220 may implement the cache 221 and the clock management request interface 224 based on executing a program of instructions stored in a memory (not shown in FIG. 6). Such a memory may be the memory 130 shown in FIG. 1.

The cache coherence interface 610 of the processor 220 is directly connected to the cache coherence interface 620 of the device 230 through a bus 240. Thus, the electronic device 200 may support cache coherence in light of hardware through direct connection between the caches 221 and 232 without using a memory.

When cache coherence is supported in light of hardware, the processor 220 may be configured to conventionally enable the clock at all times so as to serve the snoop traffic. In some example embodiments, the processor 220 may be directly connected to the CMU 210 through the clock management request interface 224 such that the processor 220 is configured to provide the clock control request directly to the CMU 210 (e.g., without being communicated through any intervening devices), such that clock gating may be performed in an environment supporting hardware cache coherence and thus dynamic power consumption may be reduced.

Referring back to FIG. 2, the CMU 210 may be controlled by a separate device (not shown in FIG. 2). The separate device that controls the CMU 210 may control the CMU 210 through the device driver of the CMU 210. More specifically, the separate device that controls the CMU 210 accesses the control register of the CMU 210 and stores a command for controlling the clock of each device included in the electronic device 200 in the control register of the CMU 210. The separate device that controls the CMU 210 may be the CPU 110 shown in FIG. 1.

So far, the structure of the electronic device 200 has been described. Hereinbelow, an operation method of the electronic device 200 will be described.

Figure 7:
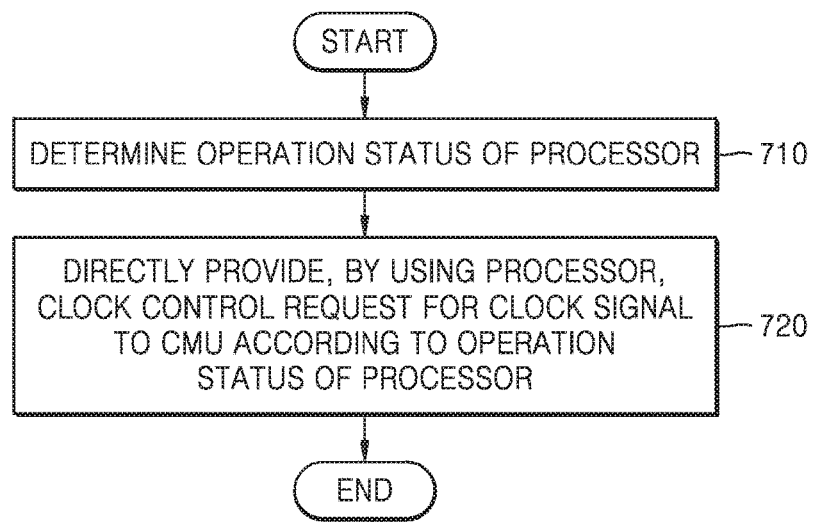
FIG. 7 is a flowchart of an operation method of an electronic device according to some example embodiments.

FIG. 7 is a flowchart of an operation method of an electronic device according to some example embodiments. The operation illustrated in FIG. 7 may be implemented by some or all of the processors, processing devices, etc. described herein.

Referring to FIG. 7, in operation 710, the electronic device 200 determines the operation status of the processor 220, that is, whether the processor 220 is in the idle status or the active status.

In operation 720, the processor 220 directly provides ("communicates") a clock control request to the CMU 210 according to the operation status of the processor 220. Based on the processor 220 determining that the operation status of the processor 220 is the idle status in operation 710, the processor 220 selectively provides the clock disable request to the CMU 210. By contrast, based on the processor 220 determining that the operation status of the processor 220 is the active status in operation 710, the processor 220 selectively provides the clock enable request to the CMU 210.

Upon receiving the clock enable request from the processor 220, the CMU 210 enables the clock input to the processor 220; based on the CMU 210 receiving the clock disable request from the processor 220, the CMU 210 disables the clock input to the processor 220. However, if a time interval between the reception of the clock disable request and the immediately previous enabling of the clock signal is less than or equal to a particular threshold time, the CMU 210 may maintain the enabled status of the clock input to the processor 220 without disabling the clock.

Figure 8:
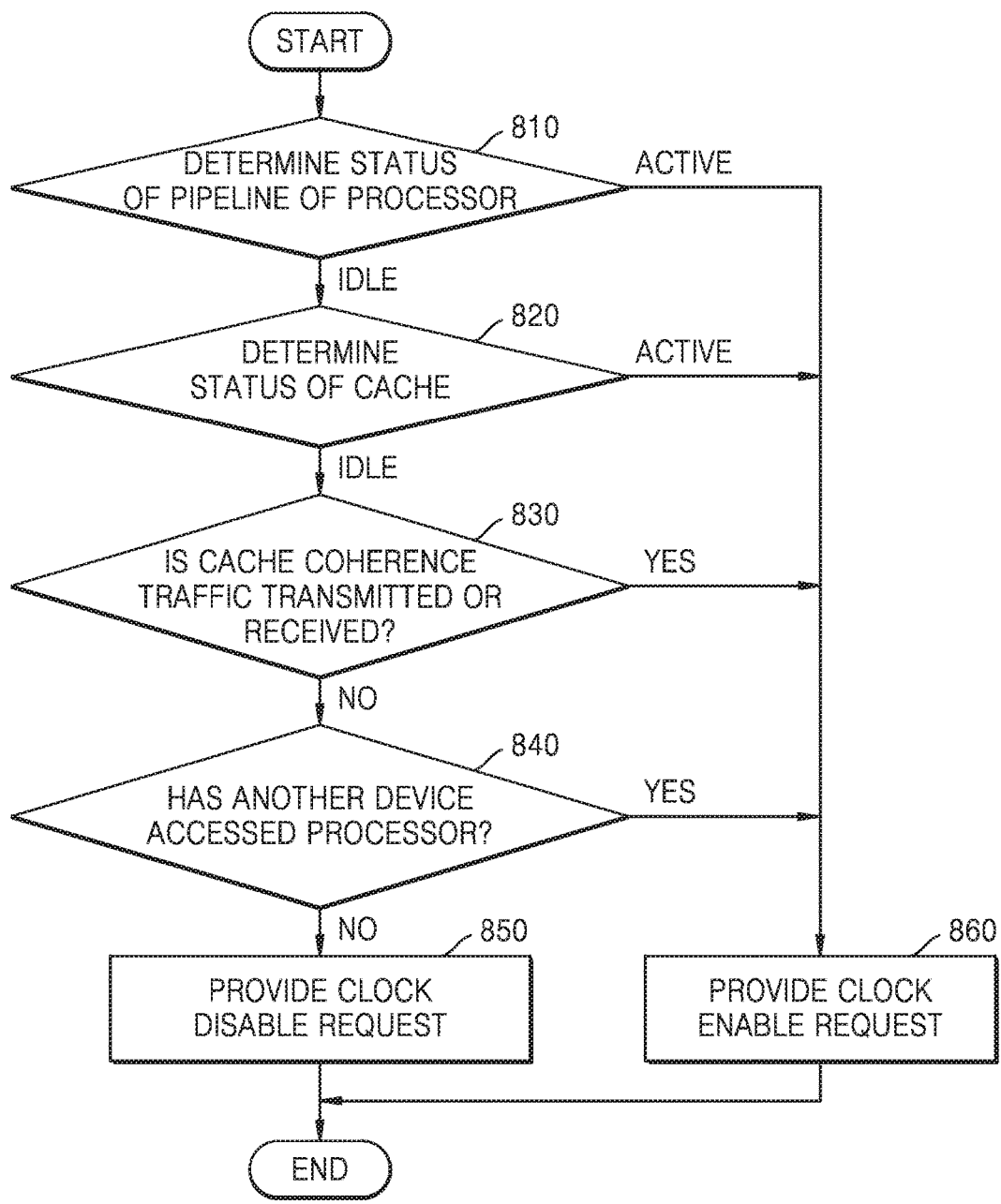
FIG. 8 is a flowchart of a method of determining an operation status of a processor according to some example embodiments.

FIG. 8 is a flowchart of a method of determining an operation status of a processor according to some example embodiments. The method illustrated in FIG. 8 may be implemented by some or all of the processors, processing devices, etc. described herein.

Referring to FIG. 8, in operation 810, the processor 220 determines the status of the pipeline of the processor 220. Based on the processor 220 determining that the pipeline is in the active status in operation 810, the processor 220 performs operation 860 to provide the clock enable request to the CMU 210. Based on the processor 220 determining that the pipeline is in the idle status in operation 810, the processor 220 performs operation 820.

In operation 820, the processor 220 determines the status of the cache 221 of the processor 220. Based on the processor 220 determining that the cache 221 is in the active status in operation 820, the processor 220 performs operation 860 to provide the clock enable request to the CMU 210. Based on the processor 220 determining that the cache 221 is in the idle status in operation 820, the processor 220 performs operation 830.

In operation 830, the processor 220 determines whether a cache coherence traffic is transmitted or received. Based on the processor 220 determining that the cache coherence traffic is transmitted or received in operation 830, the processor 220 performs operation 860 to provide the clock enable request to the CMU 210. Based on the processor 220 determining that the cache coherence traffic is not transmitted or received in operation 830, the processor 220 performs operation 840.

In operation 840, the processor 220 determines whether another device has accessed the processor 220. Based on the processor 220 determining that another device has accessed the processor 220 in operation 840, the processor 220 performs operation 860 to provide the clock enable request to the CMU 210. Based on the processor 220 determining that another device has not accessed the processor 220 in operation 840, the processor 220 performs operation 850 to provide the clock disable request to the CMU 210.

A method of determining the operation status of the processor 220 shown in FIG. 8 is according to some example embodiments, and may be implemented in other ways. For example, operation 830 of determining whether the cache coherence traffic is transmitted or received may be performed first. Operation 840 of determining whether another device has accessed the processor 220 may be performed prior to operation 820 of determining the status of the cache 221.

An apparatus according to some example embodiments may include a processor, a memory for storing program data and executing the program data, a permanent storage such as a disk drive, a communication port for communicating with external devices, and user interface devices, such as a touch panel, a key, a button, etc. Methods implemented with a software module or algorithm may be stored as computer-readable code or program instructions executable on the processor on computer-readable recording media. Examples of the computer-readable recording media may include a magnetic storage medium (e.g., read-only memory (ROM), random-access memory (RAM), a floppy disk, a hard disk, etc.) and an optical medium (e.g., a compact disc-ROM (CD-ROM), a digital versatile disc (DVD), etc.) and so forth. The computer-readable recording medium may be distributed over network-coupled computer systems so that computer-readable code is stored and executed in a distributed fashion. The medium may be read by a computer, stored in a memory, and executed by a processor.

Some example embodiments may be represented by block components and various process operations. Such functional blocks may be implemented by various numbers of hardware and/or software components which perform specific functions. For example, some example embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, some example embodiments may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, some example embodiments may employ any number of conventional techniques for electronics configuration, signal processing and/or control, data processing and the like. The term "mechanism", "element", "means", or "component" is used broadly and is not limited to mechanical or physical embodiments. The term may include a series of routines of software in conjunction with the processor or the like.

Particular executions described in some example embodiments are merely examples, and do not limit a technical range with any method. For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements.

In the present disclosure (especially, in the claims), the use of "the" and other demonstratives similar thereto may correspond to both a singular form and a plural form. Also, if a range is described in the present disclosure, the range has to be regarded as including inventions adopting any individual element within the range (unless described otherwise), and it has to be regarded as having written in the detailed description of the disclosure each individual element included in the range. Unless the order of operations of a method is explicitly mentioned or described otherwise, the operations may be performed in a proper order. The order of the operations is not limited to the order the operations are mentioned. The use of all examples or example terms (e.g., "etc.,", "and (or) the like", and "and so forth") is merely intended to described the technical spirit in detail, and the scope is not limited by the examples or example terms unless defined by the claims. Also, one of ordinary skill in the art may appreciate that the present disclosure may be configured through various modifications, combinations, and changes according to design conditions and factors without departing from the spirit and technical scope of the present disclosure and its equivalents.

What is claimed is:

1. An electronic device comprising:
   a clock management circuit configured to control a clock signal; and
   a processor circuit directly connected to the clock management circuit, the processor circuit configured to communicate a clock control request associated with the clock signal to the clock management circuit according to an operation status of the processor circuit,
   wherein the clock control request includes a clock disable request and a clock enable request, and
   wherein the clock management circuit is further configured to,
      even when the clock disable request is received at the clock management circuit, maintain an enabled status of a clock signal input to the processor circuit without disabling the clock signal, based on a determination that a time interval between reception of the clock disable request at the clock management circuit and immediately preceding enabling of the clock signal is less than or equal to a particular threshold time.

2. The electronic device of claim 1, wherein,
   the processor circuit includes a clock management request interface that is directly connected to the clock management circuit, and
   the processor circuit is further configured to
      store the operation status of the processor circuit, and
      determine the stored operation status of the processor circuit.

3. The electronic device of claim 2, wherein the processor circuit is further configured to determine whether the processor circuit is in an idle status or an active status.

4. The electronic device of claim 3, wherein the processor circuit is further configured to
   communicate the clock disable request to the clock management circuit based on a determination that the processor circuit is in the idle status, and
   communicate the clock enable request to the clock management circuit based on a determination that the processor circuit is in the active status.

5. The electronic device of claim 3, wherein the clock management circuit is further configured to
   enable the clock signal input to the processor circuit based on a determination that the clock management circuit has received the clock enable request from the processor circuit; and
   disable the clock signal input to the processor circuit based on a determination that the clock management circuit has received the clock disable request from the processor circuit.

6. The electronic device of claim 2, wherein the processor circuit includes
   a processor status register configured to
      store a status of a pipeline of the processor circuit, and
      update the status of the pipeline to an idle status based on a determination that the processor circuit has completed a last job in a job queue, and
   a cache status register configured to
      store a status of a cache included in the processor circuit, and
      update the status of the cache to an idle status based on a determination that the cache completes a requested job and is under a FIFO empty condition.

7. The electronic device of claim 6, wherein the cache includes a cache coherence interface configured to support cache coherence.

8. The electronic device of claim 7, wherein the processor circuit is further configured to
   determine whether a separate device has accessed the processor circuit and a cache coherence traffic is being communicated between the processor circuit and the separate device through the cache coherence interface;
   determine that the processor circuit is in an idle status based on a determination that
      the pipeline of the processor circuit and the cache are in the idle status,
      the cache coherence traffic is not being communicated between the processor circuit and the separate device, and
      the separate device has not accessed the processor circuit; and
   determine that the processor circuit is in an active status based on a determination that
      the pipeline of the processor circuit and the cache are in the active status,
      the cache coherence traffic is being communicated between the processor circuit and the separate device, or
      the separate device has accessed the processor circuit.

9. The electronic device of claim 7, further comprising:
   a device configured to support cache coherence with the processor circuit,
   wherein a cache included in the device includes a cache coherence interface configured to support the cache coherence, and
   the cache of the processor circuit is directly connected to the cache of the device through the cache coherence interface of the processor circuit and the cache coherence interface of the device, respectively, such that the cache of the processor circuit is configured to support hardware cache coherence.

10. An operation method of an electronic device, the operation method comprising:
    determining an operation status of a processor circuit of the electronic device; and
    directly communicating, based on using the processor circuit, a clock control request associated with a clock signal to a clock management circuit configured to control the clock signal according to the operation status of the processor circuit
    wherein the clock control request includes a clock disable request and a clock enable request, and
    wherein the clock management circuit is further configured to:
       even when the clock disable request is received at the clock management circuit, maintain an enabled status of a clock signal input to the processor circuit without disabling the clock signal, based on a determination that a time interval between reception of the clock disable request at the clock management circuit and immediately preceding enabling of the clock signal is less than or equal to a particular threshold time.

11. The operation method of claim 10, wherein the determining the operation status of the processor circuit includes determining whether the processor circuit is in an idle status or an active status.

12. The operation method of claim 11, wherein the communicating the clock control request according to the operation status of the processor circuit includes selectively communicating the clock enable request or the clock disable request to the clock management circuit based on whether the processor circuit is in the idle status or the active status, respectively, the selectively communicating including performing one of
communicating the clock disable request to the clock management circuit based on a determination that the processor circuit is in the idle status; or
communicating the clock enable request to the clock management circuit based on a determination that the processor circuit is in the active status.

13. The operation method of claim 10, further comprising:
selectively enabling the clock signal input to the processor circuit based on whether the clock enable request or the clock disable request is received from the processor circuit, the selectively enabling including performing one of
enabling the clock signal input to the processor circuit based on receiving, using the clock management circuit, the clock enable request from the processor circuit; and
disabling the clock signal input to the processor circuit based on receiving, using the clock management circuit, the clock disable request from the processor circuit.

14. The operation method of claim 10, wherein the determining of the operation status of the processor circuit includes
determining whether a pipeline and a cache of the processor circuit are in an idle status;
determining whether a cache coherence traffic is being communicated via the processor circuit; and
determining whether a separate device has accessed the processor circuit.

15. The operation method of claim 14, wherein the determining of the operation status of the processor circuit includes
communicating a clock disable request based on a determination that
the pipeline and the cache of the processor circuit are in the idle status,
the cache coherence traffic is not being communicated between the processor circuit and the separate device, and
the separate device has not accessed the processor circuit; and
communicating the clock enable request based on a determination that
the pipeline and the cache of the processor circuit are in an active status,
the cache coherence traffic is being communicated between the processor circuit and the separate device, or
the separate device has accessed the processor circuit.

16. The operation method of claim 10, further comprising:
updating a status of a pipeline of the processor circuit to an idle status based on a determination that the processor circuit has completed a last job in a job queue; and
updating a status of a cache of the processor circuit to an idle status based on a determination that the cache has completed a requested job and is under a FIFO empty condition.

17. An electronic device comprising:
a first processor circuit and a second processor circuit configured to support hardware cache coherence; and
a clock management circuit configured to control both a clock signal of the first processor circuit and a clock signal of the second processor circuit,
wherein the second processor circuit is configured to communicate a clock enable request to the clock management circuit based on a determination that the second processor circuit has received a cache coherence signal from the first processor circuit, and
the clock management circuit is configured to enable the second processor circuit in response to the clock enable request.

18. The electronic device of claim 17, wherein the first processor circuit is further configured to communicate the clock enable request to the clock management circuit based on a determination that the first processor circuit has received the cache coherence signal from the second processor circuit.

19. The electronic device of claim 17, wherein the second processor circuit is further configured to communicate the clock enable request to the clock management circuit based on a determination that the second processor circuit has communicated the cache coherence signal to the first processor circuit.

20. The electronic device of claim 19, wherein the first processor circuit is further configured to communicate the clock enable request to the clock management circuit based on a determination that the first processor circuit has provided the cache coherence signal to the second processor circuit.

21. The electronic device of claim 17, wherein the first processor circuit and the second processor circuit are associated with different processor circuit types.

22. The electronic device of claim 21, wherein the first processor circuit or the second processor circuit is a graphics processing unit (GPU).

* * * * *